United States Patent [19]
Hurst et al.

[11] 3,791,865
[45] Feb. 12, 1974

[54] HIGH MALTOSE SYRUPS
[75] Inventors: Thomas L. Hurst; Almerin W. Turner, both of Decatur, Ill.
[73] Assignee: A. E. Staley Manufacturing Company, Decatur, Ill.
[22] Filed: May 12, 1969
[21] Appl. No.: 823,937

[52] U.S. Cl. ................................ 127/32, 195/31 R
[51] Int. Cl. ............................................ C12d 13/02
[58] Field of Search..... 99/141, 142; 127/30; 195/2, 195/7, 31

[56] References Cited
UNITED STATES PATENTS
2,891,869   6/1959   Langlois................................ 99/142
3,137,639   6/1964   Hurst..................................... 99/142
3,535,123   10/1970  Heady.................................... 99/142

FOREIGN PATENTS OR APPLICATIONS
1,144,950   3/1969   Great Britain

OTHER PUBLICATIONS

Lee et al., Archives of Biochemistry and Biophysics, Volume 116, pages 162–167, 1966.

Kjolberg et al., Journal of Biochemistry, Volume 86, pages 258–262, 1963.

*Primary Examiner*—Lionel M. Shapiro
*Attorney, Agent, or Firm*—Charles J. Meyerson

[57] ABSTRACT

Storage stable high maltose starch conversion syrups having a minimum F.E. of 85%, a minimum D.E. value (dextrose equivalent) of about 50%, a maltose content of about 60 to 80% and a maltotriose content of 15 to 35%, and method for producing said syrups wherein a starch paste containing at least 5% by weight solids is saccharified with a maltogenic enzyme and amylo-1,6-glucosidase.

8 Claims, No Drawings

HIGH MALTOSE SYRUPS

DISCLOSURE OF THE INVENTION

This invention relates to storage stable high maltose starch conversion syrups having a high F.E. (fermentable extract) value and method for producing said syrups with a maltogenic enzyme and amylo-1,6-glucosidase. More particularly, this invention is directed to storage stable high maltose starch conversion syrups having a minimum F.E. of 85%, a minimum D.E. value (dextrose equivalent) of about 50%, a maltose content of about 60 to 80% and a maltotriose content of 15 to 35%, and method for producing said syrups wherein a starch paste containing at least 5% by weight solids is saccharified with a maltogenic enzyme and amylo-1,6-glucosidase.

The broad technology for producing syrups from starch, often referred to as starch conversion syrups, is well known. The starch conversion syrups of particular commercial importance are the "corn syrups" or syrups produced from corn starch. More recently, there has been a demand for specialty type starch conversion syrups particularly those having a high F.E. In general, the F.E. or fermentable saccharides of a starch is the total concentration of dextrose, maltose and maltotriose in the starch conversion syrup. The high F.E. syrups are well suited as "brewing adjuncts" in the manufacture of beer and in the so-called "brew process" of making bread in commercial bakeries since they contain a high concentration of fermentable saccharides. Of course, these syrups must remain clear and fluid under normal storage conditions.

As is well known, industrial starch conversion syrups are customarily sold at about 75% solids or above in order to prevent bacteriological spoilage during shipping and storage. This superimposes certain restrictions on these syrups. To prevent crystallization or "setting up," it is necessary to carefully regulate the dextrose and/or maltose contents of these syrups or use heated containers for shipping and storage with attendant higher costs. For example, high F.E. starch conversion syrups containing over 47% D.S.B. (dry solids basis) dextrose have a decided tendency to crystallize. Under adverse storage conditions, such as is experienced during the fall and winter months, crystallization has been detected at dextrose concentrations between 41 and 45% D.S.B. On the other hand, maltose has a decidedly smaller tendency to crystallize than dextrose.

There has also been a demand for high F.E. starch conversion syrups having relatively low levels of dextrose (less than 10% by weight) since these syrups are well suited for use in manufacture of hard candies where they are less susceptible to browning than ordinary corn syrups and wherein they permit somewhat higher pH levels to be used during boiling with sucrose without the development of excessive sucrose color. These high F.E. syrups containing a relatively low concentration of dextrose and products produced therefrom are markedly less hygroscopic than regular corn syrup and products produced therefrom. This property is particularly beneficial in retarding crystallization of hard candies during shelf storage.

Prior to this invention, syrups having a high maltose content have been prepared by the saccharification of starch or starch hydrolyzates with maltogenic enzymes. For example, unmodified corn starch has been saccharified with malt to produce syrups having a D.E. of about 42 to 48, a F.E. of about 70 to 75 and a maltose content of about 50% by weight of the saccharified solids. Syrups having a D.E. of about 50 to 55 and a F.E. of about 75 to 80 have been produced by saccharifying a partially hydrolyzed starch syrup with various amylases, as explained in British Specification No. 1,037,254. These syrups, generally speaking, have a relatively high concentration of saccharides having a D.P. of 4 or more (in excess of about 20% by weight), which results in the syrups having a F.E. dnder about 80. Syrups having a D.E. of more than 55 and a F.E. of 80 or more have been produced by further saccharifying the previously described hydrolyzates with amylo-1,4-glucosidase preparations, free of transglucosidase. This type of saccharification results in the formation of large concentrations of dextrose and, in general, the maltose concentration of the syrup decreases as the dextrose concentration increases.

Recently, a process has been described wherein an aqueous 0.5% by weight starch composition has been saccharified with a mixture of beta amylase and amylo-1,6-glucosidase to produce products having substantially 95 to 99% by weight maltose. While it is economically impractical to produce starch conversion syrups at these low solids, this process is unsuitable for the production of storage stable commercial high F.E. syrups, since these syrups tend to crystallize when concentrated to solids content necessary to prevent bacteriological spoilage during shipping and storage. It would appear that this process would be suitable for the production of crystalline maltose.

The object of this invention is to provide storage stable high maltose starch conversion syrups having a minimum F.E. of 85%, a minimum D.E. value of about 50%, a maltose content of 60 to 80% and a maltotriose content of 15 to 35%. Other objects will appear hereinafter.

We have now found that storage stable high maltose starch conversion syrups containing from about 75 to 85% by weight solids having a minimum F.E. of 85%, a minimum D.E. of about 50, a maltose content of 60 to 80% by weight and a maltotriose content of 15 to 35% by weight can be prepared by saccharifying a starch paste containing from about 5 to 55% by weight solids with a maltogenic enzyme, such as beta amylase, and amylo-1,6-glucosidase. The syrups produced in this manner generally contain in the range of about 65 to 80% maltose, about 18 to 33% maltotriose with relatively small concentrations (usually less than 2% by weight) of dextrose and saccharides having a D.P. of 4 or more. Due to the relatively high level of maltotriose, these high F.E. syrups do not crystallize when concentrated to high solids, and accordingly, are not subject to bacteriological spoilage during shipping or storage.

Briefly, the products of this invention are prepared by forming an aqueous starch slurry of about 5 to 55% solids. The starch slurry is then pasted and/or thinned to a D.E. up to about 35 by the use of an acid or enzyme or a combination thereof. The resultant starch paste is then adjusted, if necessary, to a pH between 4.0 and 6.5, preferably to a pH between 4.5 and 5.9, and a solids content of between 5 to 55% by weight, and saccharified by adding a maltogenic enzyme and amylo-1,6-glucosidase. The composition is maintained at a temperature of about 85°F. to 170°F. for from 24 to 100 hours or for a time sufficient to obtain the desired syrup. The syrup is then preferably refined and concentrated.

The starch used in this invention may be any native starch, a modified starch, or a low D.S. (degree of substitution) starch derivative. Corn starch, tapioca starch, rice starch, waxy maize starch, potato starch, wheat starch, sorghum starch and waxy milo starch are representative of the starches that can be used in this invention.

The maltogenic enzyme may be derived from a variety of sources, for example, plants, animals or microorganisms, and may be either crude or refined. A convenient source of maltogenic enzyme, and particularly one having a high concentration of beta-amylase, is barley malt. Barley malt is available from a number of commercial sources under various proprietary names, e.g., Fromalt 72, enzymically highly active malted barley produced by Froedtert Malt Company, Milwaukee, Wis.

The amount of maltogenic enzyme required in combination with amylo-1,6-glucosidase to saccharify starch to produce a high F.E. syrup of this invention will vary depending on the source, purity, etc., of the enzyme. For the most part, when an enzymatically highly active malted barley is used as the source of maltogenic enzyme, concentrations of malt can range from 0.1 to 2% by weight of the starch on a dry solids basis.

The amylo-1,6-glucosidase, often referred to as "pullulanase" is an enzyme capable of selectively hydrolyzing alpha-1,6-glucosidic bonds of the amylopectin fraction of starch. Other enzymes capable of hydrolyzing alpha-1,6-glucosidic bonds are referred to in the literature as "iso-amylase" and "R-enzyme."

The preparation of an enzyme exhibiting amylo-1,6-glucosidase activity was reported by Bender & Wallenfels in Biochemische Zeitschrift, Vol. 334, pages 79–95 (1961). Other information covering the use and production of this enzyme can be found in Methods of Enzymology, Vol. 8, pages 555–559 (1966). According to the above references, amylo-1,6-glucosidase can be readily obtained from the organism Aerobacter aerogenes. Certain strains of the organism, Aerobacter aerogenes, have been reported to be particularly good sources for obtaining this enzyme. For example, Aerobacter aerogenes (U-58), which is reported to be a direct descendant of the original strain isolated by Bender & Wallenfels has been found to be a particularly good source of this enzyme. Various ultraviolet induced mutants of Aerobacter aerogenes (U-58) can also be used. Other reported strains of Aerobacter aerogenes which can be used include Aerobacter aerogenes ATCC 9621 and ATCC 15050.

Preparations of amylo-1,6-glucosidase or pullulanase can be obtained from the organism Aerobacter aerogenes by known cultivating methods. A suitable technique is described in the Bender & Wallenfels publication previously referred to. If desired, the crude preparation can be purified prior to use. However, the utility of the enzyme in the process of this invention is not restricted to preparations of any specific purity. Obviously, though, the use of an enzyme substantially free of contaminants would be advantageous.

The amount of amylo-1,6-glucosidase is not particularly critical and depends to a large degree on the concentration of starch, the activity of the enzyme, reaction conditions, etc. Generally, from about 0.05 to 2 units of amylo-1,6-glucosidase per gram of starch, and preferably from about 0.25 to 1 unit per gram of starch, are used. One unit of amylo-1,6-glucosidase is defined as that amount of enzyme present in 1.0 ml. of solution which, with excess pullulan as a substrate under standard conditions of assay, raises the reducing value within one hour at 45° to a value which is equivalent to 1 mg. of maltose.

In somewhat greater detail, the products of this invention are prepared by forming an aqueous starch slurry of about 5 to 55% solids. The starch is then pasted and/or thinned to a D.E. up to about 35 by the use of acid or enzyme or combination thereof. Other things being equal, unthinned, pasted, starch substrates yield syrups having a F.E. about 2% higher than thinned substrates. However, from a purely operational point of view, it is preferred to thin the starch substrate to a D.E. of about 15 to 25 using an alpha amylase, preferably that heat stable alpha amylase derived from Bacillus subtilis at 60° to 100°C. The resultant starch paste is then adjusted, if necessary, to a pH between 4.0 and 6.5, preferably to a pH between 4.5 and 5.9, and a solids content between 5 to 55% by weight and saccharified by adding a maltogenic enzyme preparation and amylo-1,6-glucosidase. The maltogenic enzyme preparation and amylo-1,6-glucosidase can be added simultaneously or sequentially with best results being obtained by adding both at substantially the same time. The composition is incubated at a temperature of about 85°F. to 170°F. for from 24 to 100 hours or a time sufficient to obtain a conversion product having a D.E. of at least 50%, a maltose content of 60 to 80%, a maltotriose content of 15 to 35% and yeast fermentable content of at least 85%. The syrup is then preferably refined and concentrated to about 75 to 85% solids.

The examples following are merely illustrative and should not be construed as limiting the scope of the invention.

EXAMPLE 1

Nine hundred grams of unmodified corn starch (dry solids basis) was slurried in 6 liters of water, adjusted to pH 5.0 and cooked in a jet cooker of the type described in U. S. Patent 3,101,284 at 56 psig for 15 minutes. The cooked starch was cooled to 50°C. and 1.2 grams of Wallerstein's malt amylase PF (free of alpha amylase) and 2 units of amylo-1,6-glucosidase per gram of starch was added. After saccharification for 48 hours at 50°C., the syrup had a D.E. of 57.6. After 112 hours, the starch syrup had a D.E. of 57.7, a D. 1.3, 70% maltose and about 29% maltotriose.

EXAMPLE 2

A 35% by weight aqueous corn starch slurry was adjusted to pH 8.1 and cooked in a jet cooker of the type described in U. S. Pat. No. 3,101,284 at 66 psig for 5 minutes. The cooked paste was ejected into a solution of alpha amylase (Bacillus subtilis) containing 2.5 SKB units of amylase per gram of starch and maintained at 190°F. for 2 hours. The alpha amylase was inactivated by heating at 205°F. for 20 minutes forming a 15.7 D.E. starch paste. After the starch paste was cooled to room temperature and adjusted to pH 5.7, an aqueous extract of distillers malt equivalent to 1.5% malt based on the starch dry solids and 2 units of amylo-1,6-glucosidase per gram of starch was added. The starch paste was diluted into aliquots of 5.67% solids, 10.94% solids, 16% solids, 20.65% solids, 25.06% solids and 31.44% solids. After dilution, the hydrolyzates were incubated at 130° F. for 68 hours, steamed and filtered. The properties of the saccharified starch syrups are set forth below in Table I.

Table I

| Solids | D.E. | % Dextrose | % Maltose | % Maltotriose | % F.E. |
| --- | --- | --- | --- | --- | --- |
| 5.67% | 57.7% | Trace | 75.83% | 21.74% | 97.57% |
| 10.94% | 57.5% | Trace | 76.92% | 21.25% | 98.17% |
| 16.00% | 56.5% | Trace | 79.16% | 19.52% | 98.68% |
| 20.65% | 56.9% | 1.14% | 77.53% | 19.22% | 97.89% |
| 25.06% | 56.8% | 1.75% | 73.60% | 21.80% | 97.15% |
| 31.44% | 55.1% | 1.95% | 73.16% | 20.70% | 95.81% |

The above syrups did not crystallize on concentration to 80% solids.

Since many embodiments of this invention may be made and since many changes may be made in the embodiments described, the foregoing is interpreted as illustrative only and the invention is defined by the claims appended hereafter.

What is claimed is:

1. A storage stable high maltose starch conversion syrup having a minimum F.E. of 85%, a minimum D.E. of about 50%, a maltose content of 60 to 80% and a maltotriose content of about 18% to 35%.

2. The composition of claim 1 wherein said syrup contains from about 75% to 85% by weight dry solids.

3. The conversion syrup according to claim 1, wherein the syrup is characterized as having a dextrose content of less than 2.0% and a minimum F.E. of about 95%.

4. The conversion syrup according to claim 1 wherein the syrup is characterized as having a maltotriose content from about 18% to 33% and contains less than 2% by weight of dextrose and saccharides having a D.P. of 4 or more.

5. The conversion syrup according to claim 2 wherein the storage stable syrup contains from 18% to 33% maltotriose and 65% to 80% maltose.

6. A process for forming a storage stable high maltose starch conversion syrup comprising (a) saccharifying a starch paste containing from about 5% to 55% by weight starch solids in the presence of amylo-1,6-glucosidase and a beta-amylase preparation substantially free from alpha amylase, said saccharifying being conducted under conditions and for a period of time sufficient to provide a conversion syrup having a minimum F.E. of about 95%, a minimum D.E. of about 50%, a maltotriose content of about 18% to 35%, a maltose content of 60% to 80%, and a maximum dextrose content of less than 2.0%, and (b) concentrating the conversion syrup to about 75% to 85% by weight dry solids and thereby provide a high solids, storage stable high maltose starch conversion syrup product.

7. The process of claim 6 wherein the starch is unthinned.

8. The process according to claim 6 wherein the starch is thinned with a heat stable alpha amylase, said alpha amylase comprising a heat stable enzyme of Bacillus subtilis.

* * * * *